US009900155B2

(12) United States Patent
Hickmott et al.

(10) Patent No.: US 9,900,155 B2
(45) Date of Patent: Feb. 20, 2018

(54) SECURITY TECHNIQUES FOR COOPERATIVE FILE DISTRIBUTION

(75) Inventors: Andrew Hickmott, New York, NY (US); Laird A. Popkin, West Orange, NJ (US); Yaar Schnitman, New York, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 906 days.

(21) Appl. No.: 12/789,837

(22) Filed: May 28, 2010

(65) Prior Publication Data

US 2010/0235641 A1 Sep. 16, 2010

Related U.S. Application Data

(63) Continuation of application No. 11/519,990, filed on Sep. 12, 2006, now abandoned.

(51) Int. Cl.
*H04L 9/32* (2006.01)
*H04L 29/06* (2006.01)

(52) U.S. Cl.
CPC .......... *H04L 9/3213* (2013.01); *H04L 9/3236* (2013.01); *H04L 29/06* (2013.01); *H04L 2209/60* (2013.01); *H04L 2209/76* (2013.01)

(58) Field of Classification Search
USPC .................................................. 709/227–244
See application file for complete search history.

(56) References Cited

U.S. PATENT DOCUMENTS

| | | | |
|---|---|---|---|
| 5,548,648 | A | 8/1996 | Yorke-Smith |
| 5,963,646 | A | 10/1999 | Fielder et al. |
| 6,104,810 | A | 8/2000 | Debellis et al. |
| 6,343,738 | B1 | 2/2002 | Ogilvie |

(Continued)

OTHER PUBLICATIONS

Yang, W.; Abu-Ghazaleh, N.; , "GPA: a general peer-to-peer simulator and its use for modeling BitTorrent," Modeling, Analysis, and Simulation of Computer and Telecommunication Systems, 2005. 13th IEEE International Symposium on , vol., No., pp. 425-432, Sep. 27-29, 2005 doi: 10.1109/MASCOTS.2005.31 URL:http://ieeexplore.ieee.org/document/1521163/.*

(Continued)

*Primary Examiner* — Tsan-Yu J Huang
(74) *Attorney, Agent, or Firm* — Alleman Hall Creasman & Tuttle LLP

(57) ABSTRACT

Security techniques are provided for cooperative file distribution. An encryption key or a nonce (or both) are generated for a package containing one or more files that are to be sent in a cooperative file distribution system. Random access encryption techniques can be employed to encrypt a package containing one or more files to be sent in a cooperative file distribution system. One or more storage proxies are allocated to a package to be transmitted in a cooperative file distribution system, based on load. Access to trackers in the cooperative file distribution system is controlled using security tokens. Content can automatically expire using a defined expiration period when the content is uploaded into the system. Variable announce intervals allow the tracker to control how often the tracker will receive a message, such as an announcement or a heartbeat message, from peers in the system.

16 Claims, 14 Drawing Sheets

(56) References Cited

U.S. PATENT DOCUMENTS

| | | | | |
|---|---|---|---|---|
| 6,412,070 | B1 * | 6/2002 | Van Dyke et al. | 726/17 |
| 6,990,656 | B2 * | 1/2006 | Ersek | G06F 9/44505 707/E17.005 |
| 2004/0024688 | A1 * | 2/2004 | Bi | G06F 21/10 705/37 |
| 2005/0027784 | A1 * | 2/2005 | Fusari | G06F 9/461 709/200 |
| 2005/0203851 | A1 | 9/2005 | King et al. | |
| 2006/0224687 | A1 | 10/2006 | Popkin et al. | |
| 2007/0074019 | A1 * | 3/2007 | Seidel | H04L 63/0823 713/156 |
| 2007/0201502 | A1 * | 8/2007 | Abramson | H04L 67/32 370/429 |
| 2008/0059992 | A1 * | 3/2008 | Amidon | G06Q 30/0201 725/25 |
| 2010/0011103 | A1 * | 1/2010 | Luzzatti | H04L 29/06027 709/226 |
| 2010/0235641 | A1 * | 9/2010 | Hickmott | H04L 9/3213 713/170 |

OTHER PUBLICATIONS

Guo, L.; Chen, S.; Zhang, X.; , "Design and evaluation of a scalable and reliable P2P assisted proxy for on-demand streaming media delivery," Knowledge and Data Engineering, IEEE Transactions on, vol. 18, No. 5, pp. 669- 682, May 2006 doi: 10.1109/TKDE.2006.79 URL: http://ieeexplore.ieee.org/stamp/stamp.jsp?tp=&arnumber=1613869&isnumber=33879.*

Bittorrent Protocol Specification v1.0, Aug. 28, 2006, Theory.org Wiki.*

Cohen, B., "Incentives Build Robustness in BitTorrent," Available at http://bittorrent.com/bittorrentecon.pdf, May 22, 2003, 5 pages.

"BitTorrent: Documentation," Website Available at http://bittorrent.comiclocumentation.html, Available as Early as Sep. 16, 2004, 1 page.

* cited by examiner

Specification: SP Allocation Function

RegisterSP

Every 1 minute, SPs report themselves and their load to Services, using the RegisterSP call. This call has the following fields:

710

- Allocated Storage (total of all published torrents assigned to this SP)
- Maximum Allocated Storage (maximum allowed, over which publishing to this SP is blocked. Should be max used storage * 1.5)
- Used Storage (disk space actually consumed on SP)
- Maximum Used Storage (total storage available on SP's storage partition)
- Connections (network connections)
- Maximum Connections (above this, the SP won't be allocated, should be 400)
- Active Torrents (actively being transferred now)
- Maximum Active Torrents (above this, the SP won't be allocated, should be 500)
- Torrents (active + inactive torrents)
- Maximum Torrents (above this, the SP won't be allocated, should be 2,500)

Picking an SP - 730

Services 630 reload the table 720 into their memory, excluding SPs that didn't register for more than 5 minutes, assuming they must be offline.

Each SP is assigned a weight based on its total load numbers.

Then a dice is rolled, picking an SP with a frequency matching its weight.

Weight is computed according to available diskspace and optionally additional factors

FIG. 7A

Resource Groups and Locations – 740

SPs are grouped into resource groups and locations, in that order. The weight is calculated relatively to the location, and to the resource group, so that SP are load balanced within the correct context.

Debugging/Monitoring

SP weights are listed in the SOAPServices servlet and in the log every few minutes.

New Weight Function - 750

Here's how we now compute `weight` for a given SP (where higher weights have higher chance of being allocated, and zero weight means that the SP can't be allocated):

760

```
// Definition of "available space" depends on which is smaller,
// available disk storage or available *allocated* disk storage.
freeStorage = maxUsedStorage - usedStorage
unallocatedStorage = maxAllocatedStorage - allocatedStorage

if (unallocatedStorage < freeStorage)
    usedSpace = allocatedStorage
    maxSpace = maxAllocatedStorage
else
    usedSpace = usedStorage
    maxSpace = maxUsedStorage

{Continued in FIG. 7C}
```

FIG. 7B

```
{Continued from FIG. 7B}
// Compute ratios indicating the availability of four types of
// resource the SP provides.
//
770 spaceFactor      = computeWeightingFactor(usedSpace,      maxSpace)
    connectionFactor = computeWeightingFactor(connections,    maxConnections)
    activeFactor     = computeWeightingFactor(activeTorrents, maxActiveTorrents)
    torrentFactor    = computeWeightingFactor(torrents,       maxTorrents)

allocationFactor = user defined number in storage_proxies table allowing manual control over the algorithm

780 weight = allocation-factor*((space-factor * connection-factor * active-factor * torrent- factor)^0.25)
```

The `computeWeightingFactor()` function:

- returns `available/max`, where `available = max - used`
- constrains its return value to the range 0-1
- returns 1 if the max parameter is -1, which indicates that operations forgot to configure the MAX value for that variable; returning 1 takes that factor out of the equation

FIG. 7C

Announce Interval Computation Process 800

810

```
if (peer is a storage proxy)
 {
    //special case for sp cheat clients
    res = SP_INTERVAL;
 }
 else
```

830

```
 if (storage proxy is being allocated
     and
     peer is a leech
     or
     peer is uploading (showseeds=1))
 {
    //special case for when sp is being allocated
    res = min(max(now - allocate start time, SECOND), PEER_INTERVAL)
 }
 else
 if (torrent last access time - torrent creation time > OLD_TORRENT_PERIOD)
{
    //special case for old torrents
    res = OLD_TORRENT_ANNOUNCE_INTERVAL;
}
else
```

```
if (number of participating peers > LONG_ANNOUNCE_MIN_PEERS)
{
    //special case for the bigger torrents
    //announce interval is a function of the number of peers + some randomness
    res = #of peers * PEER_INTERVAL * LONG_ANNOUNCE_FACTOR * randomization

    //trim by min/max values
    res = max(min(res, LONG_ANNOUNCE_MAX_INTERVAL), PEER_INTERVAL)
}
else
if (peer is not firewalled
    &&
    All seeds in the torrent are storage proxies
    &&
    peer is not uploading)
{
    //special case for non-firewalled seeds (with no show seeds) where sps are not leeches
    res = NON_FIREWALLED_SEEDS_INTERVAL;
}
else
{
    //default
    res = PEER_INTERVAL;
}
```

FIG. 8B

Token Format - 1100

| Length (bytes) | Field Name | Description |
|---|---|---|
| 8 | salt | random noise |
| 8 | timestamp | used to verify token expiration |
| 4 | sanity check | constant value |
| 4 | type | reserved for future purposes |
| 32 | torrent id | binds token usage to this torrent |
| 16 | session id | for tracking purposes |
| 20 | peer id | binds token usage to this peer |
| 4 | tracker id | binds token usage to this tracker |

FIG. 11

SECURITY TECHNIQUES FOR COOPERATIVE FILE DISTRIBUTION

CROSS-REFERENCE TO RELATED APPLICATIONS

This application is a continuation of U.S. patent application Ser. No. 11/519,990, filed Sep. 12, 2006, incorporated by reference herein.

FIELD OF THE INVENTION

The present invention relates generally to communication methods and systems, and more particularly, to cooperative and secure methods and systems for sharing one or more files among users.

BACKGROUND OF THE INVENTION

The providers of popular, large digital files, such as software, music or video files, must keep pace with the ever increasing bandwidth demands for delivering such files. As the popularity of a file increases, a larger number of users are requesting the file and more bandwidth is required to deliver the file. With conventional Hypertext Transfer Protocol (HTTP) file delivery techniques, for example, the bandwidth requirements increase linearly with the number of requesting users, and quickly becomes prohibitively expensive.

A number of techniques have been proposed or suggested for reducing the bandwidth demands of file delivery on the server, using peer-to-peer content sharing. In a peer-to-peer content sharing model, often referred to as "cooperative distribution," one or more users that have downloaded a file from the server can share the file with other users. A cooperative distribution model allows a server to deliver large files in a reliable manner that scales with the number of requesting users. Among other benefits, cooperative distribution models exploit the underutilized upstream bandwidth of existing users.

The BitTorrent™ file distribution system, described, for example, in http://www.bittorrent.com/documentation.html, or Bram Cohen, "Incentives Build Robustness in BitTorrent," http://www.bittorrent.com/bittorrentecon.pdf (May 22, 2003) is an example of a cooperative distribution technique. When multiple users are downloading the same file at the same time using the BitTorrent file distribution system, the various users upload pieces of the file to each other. In other words, a BitTorrent user trades pieces of a file that the user has with other required pieces that other users have until the complete file is obtained. In this manner, the cost of uploading a file is redistributed to the users of the file and the cost of hosting a popular file is more affordable.

While the BitTorrent file distribution system provides an effective mechanism for distributing large files in a cost effective manner, it suffers from a number of limitations, which if overcome, could further improve the utility and efficiency of cooperative file distribution. In particular, if a BitTorrent receiver is offline, then the receiver is unable to obtain files from other users. U.S. patent application Ser. No. 11/096,193, filed Mar. 31, 2005, entitled "Method and Apparatus for Offline Cooperative File Distribution Using Cache Nodes," discloses a cooperative file distribution system that uses one or more storage proxies to store the files that are being transferred among users.

A need still exists for improved security techniques for a cooperative file distribution system.

SUMMARY OF THE INVENTION

Generally, security techniques are provided for cooperative file distribution. According to one aspect of the invention, a method and system are provided for generating an encryption key or a nonce (or both) for a package containing one or more files that are to be sent in a cooperative file distribution system. Initially, samples are obtained of at least a portion of each of the files. Thereafter, a hash is applied to the samples and the encryption key or nonce (or both) are generated from a result of the hash.

According to another aspect of the invention, random access encryption techniques are employed to encrypt a package containing one or more files to be sent in a cooperative file distribution system. The package is first separated into pieces of a predefined size, and then a random access encryption technique is applied to each of the pieces. The encrypted package is comprised of the encrypted pieces.

According to yet another aspect of the invention, one or more storage proxies are allocated to a package to be transmitted in a cooperative file distribution system. The load of each of storage proxies is evaluated, and a weight is assigned to each storage proxy based on the evaluated load. Thereafter, a storage proxy is selected for the package using one or more predefined criteria to balance a load among the storage proxies.

Another aspect of the invention controls access to a tracker in a cooperative file distribution system. The tracker allows peers associated with related content to discover each other. The tracker receives a request to upload or download content. Thereafter, the tracker determines if the sender of the request is authorized. The tracker will provide a security token to the sender of the request, whereby the security token can then be used to establish an authorization between the sender of the request and the tracker.

According to further aspects of the invention, content, such as a package of one or more files, can automatically expire using a defined expiration period when the content is uploaded into the system. In addition, a variable announce interval mechanism is disclosed that allows the tracker to control how often the tracker will receive a message, such as an announcement or a heartbeat message, from peers in the system.

A more complete understanding of the present invention, as well as further features and advantages of the present invention, will be obtained by reference to the following detailed description and drawings.

BRIEF DESCRIPTION OF THE DRAWINGS

FIGS. 7A through 7C, collectively, are a functional specification for a storage proxy allocation process incorporating features of the present invention;

FIGS. 8A and 8B, collectively, are pseudo code for an exemplary announce interval computation process incorporating features of the present invention;

FIG. 11 is a sample table identifying an exemplary token format.

DETAILED DESCRIPTION

The present invention provides improved security techniques for a cooperative file distribution system.

BitTorrent Framework

Figure 1:
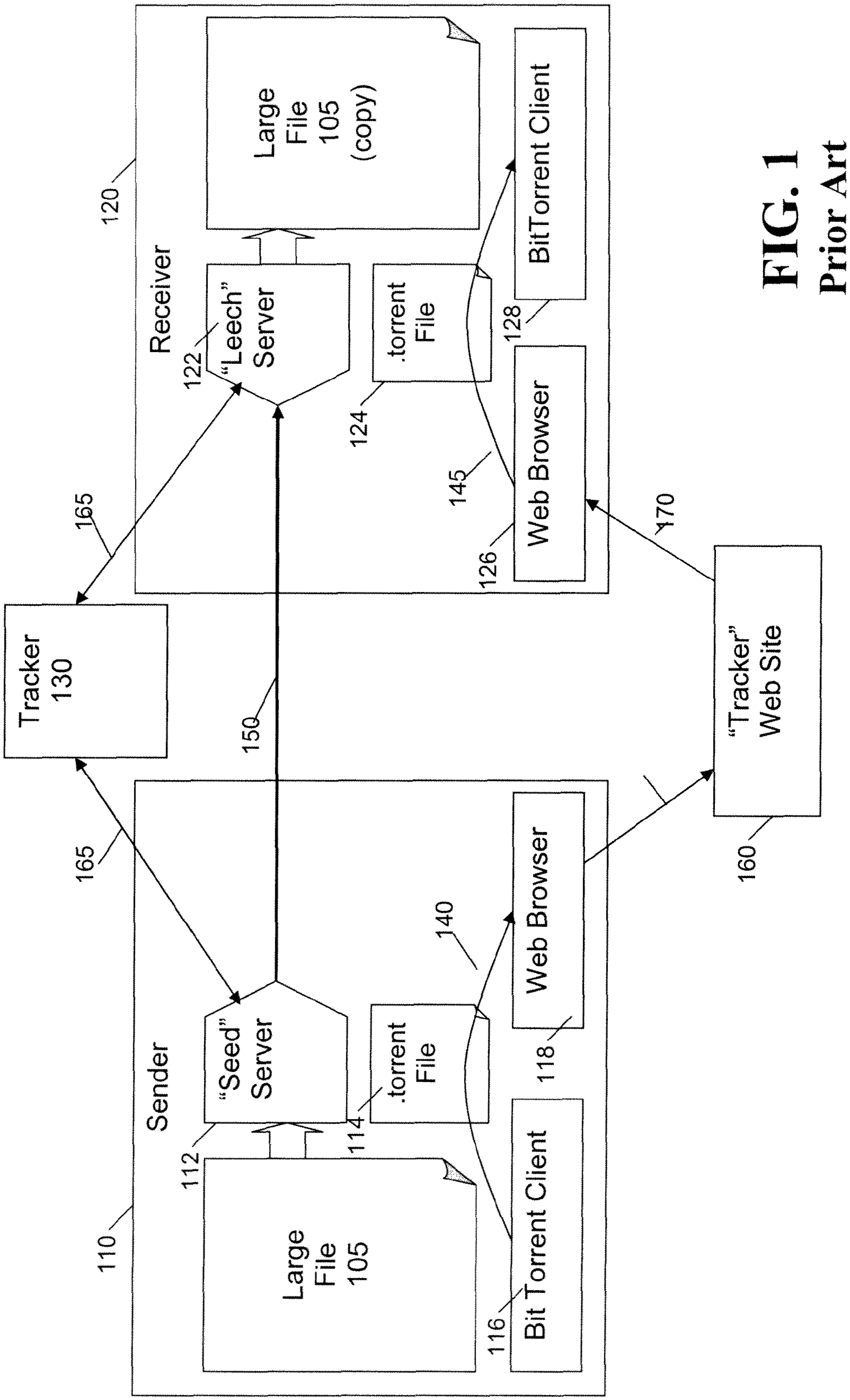
FIG. 1 is a schematic block diagram illustrating a conventional BitTorrent file distribution system.

FIG. 1 is a schematic block diagram illustrating a conventional BitTorrent file distribution system 100. As shown in FIG. 1, a sender 110, desiring to send one or more large files 105 to a receiver 120, interacts with a tracker 130 that is part of the BitTorrent file distribution system 100. For a more detailed discussion of the BitTorrent file distribution system 100, see, for example, BitTorrent Protocol, http://www.bittorrent.com/protocol.html, or BitTorrent Guide, http://www.bittorrent.com/guide.html, each incorporated by reference herein.

Generally, to publish one or more files 105 using the BitTorrent file distribution system 100, a corresponding static file 114 with extension .torrent is put on a web server 160. In particular, as shown in FIG. 1, a BitTorrent client 116 executing on the sender computing device 110 typically initiates a web browser 118, for example, via a manual post 140, to place the torrent file 114 on the BitTorrent web server 160. Alternatively, the torrent file 114 can be sent by email to the receiver 120. The web browser 118 communicates with the BitTorrent web server 160, for example, by means of conventional HTTP communications 170. The .torrent file 114 contains information about the file, including its length, name, and hashing information, and the web address (e.g., a URL) of a tracker 130. Trackers 130 are responsible for helping users find each other.

Trackers 130 communicate using a protocol that may be layered on top of HTTP in which a downloader 110, 120 sends information regarding the one or more files that the user is downloading, the port that the user is listening on, and similar information, and the tracker 130 responds with a list of contact information for peers that are downloading the same file. Downloaders 110, 120 then use this information to connect with one another.

To make one or more files 105 available, a downloader 110 having the complete file(s) 105 initiates a seed server 112, using the BitTorrent client 116. The bandwidth requirements of the tracker 130 and web server 160 are low, while the seed must send out at least one complete copy of the original file.

The responsibilities of the tracker 130 are generally limited to helping peers (i.e., users) find each other. Typically, the tracker 130 returns a random list of peers to each user. In order to keep track of the files and file pieces held by each user 110, 120, the BitTorrent file distribution system 100 divides files into pieces of fixed size, typically a quarter megabyte. Each downloader 110, 120 reports to all of its peers via the tracker 130, the pieces held by the respective downloader 110, 120. Generally, each peer sends bit torrent tracker messages 165 to the tracker 130. To verify data integrity, a hash of each piece can be included in the .torrent file 114, and a given peer does not report that it has a given piece until the corresponding hash has been validated.

On the receiver side 120, the receiver 120 reads the web page on the tracker web site 160 with .torrent file 114 attached and uses the browser 126 to click on the .torrent file. As a result, the BitTorrent client 128 is launched on the receiver 120 and the .torrent file 124 is provided to the client process 128. In addition, the BitTorrent client 128 initiates a "Leech" server 122 that allows the receiver 120 to connect to the public tracker 130. In this manner, the file 105 is sent from the "seed" 112 to the "leech" 122 via connection 150, such as an offline peer-to-peer connection or swarm delivery, in a known manner. The file copy 105 can then be opened by the receiver 120, for example, using an operating system function.

Cooperative File Distribution Using Storage Proxies

Figure 2:
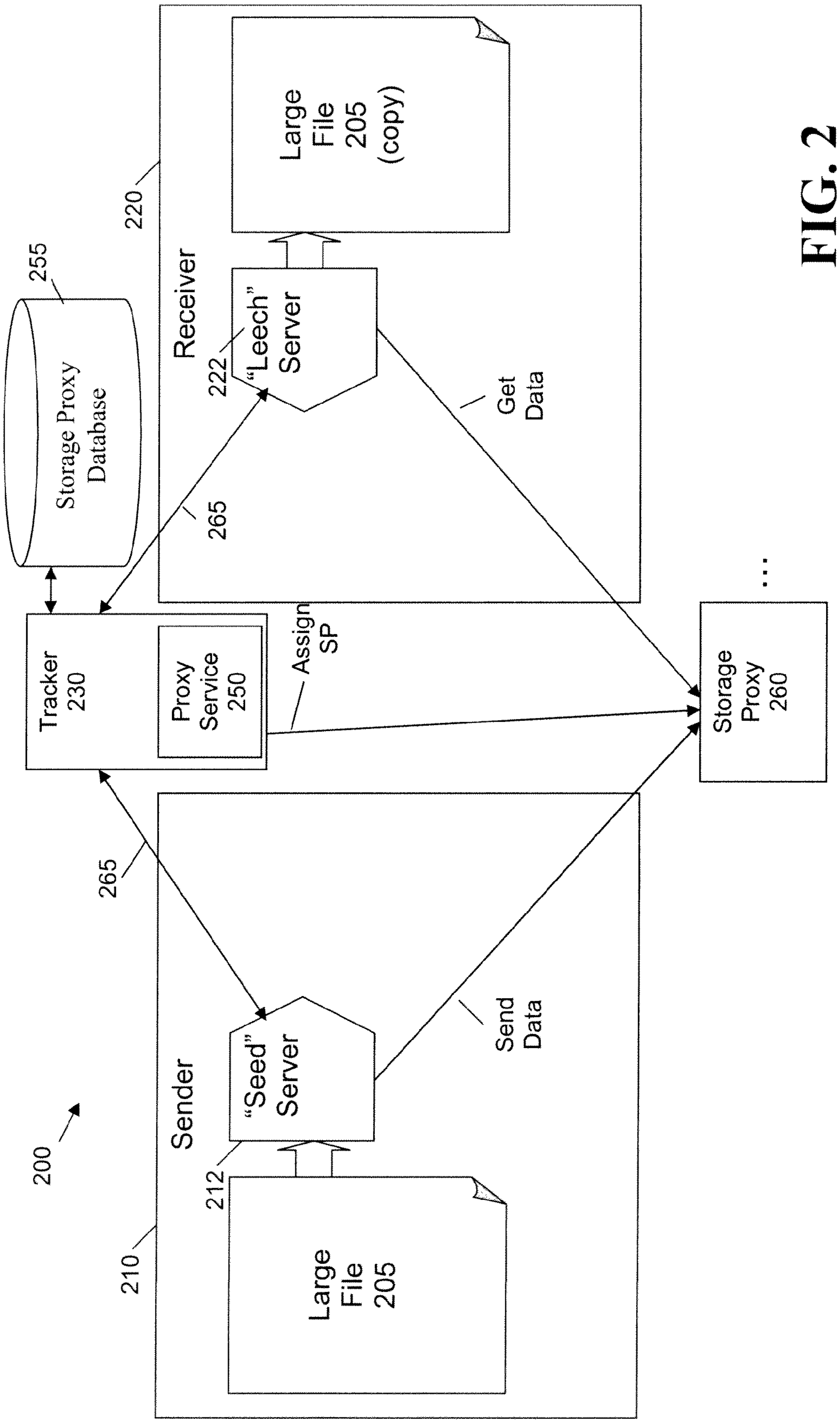
FIG. 2 is a schematic block diagram of a cooperative file distribution system incorporating features of the present invention.

FIG. 2 illustrates a cooperative file distribution system 200 that employs one or more storage proxies 260. Among other benefits, the storage proxy 260 allows an offline receiver to obtain files or pieces thereof when the receiver comes online.

Storage node 260 can cache communications between two nodes 210, 220. The sender 210 deposits blocks of data into the proxy node 260 for subsequent retrieval by one or more receivers 220. A receiver 220 can thereafter retrieve that data from the storage proxy 260.

The cooperative file distribution system 200 may be implemented, for example, using the BitTorrent file distribution system 100 of FIG. 1, as modified herein to provide the features and functions of the present invention. As discussed hereinafter, the cooperative file distribution system 200 includes a tracker 230 that may be implemented using the tracker 130 of the BitTorrent file distribution system 100 of FIG. 1, as modified herein to provide the features and functions of the present invention.

In addition, as discussed further below, the cooperative file distribution 200 employs a proxy service 250 to identify potential nodes that are available to serve as storage proxy 260. The proxy service 250 may be integrated with the tracker 230, as shown in FIG. 2, or may be a stand-alone device, as would be apparent to a person of ordinary skill in the art. The proxy service 250 may employ, for example, a storage proxy database 255 that identifies the nodes that are available to serve as storage proxy 260. For each potential storage proxy 260, the exemplary storage proxy database 255 provides a measure of the idleness, available disk space, available bandwidth, and the likelihood that the node is online (e.g., a characterization of whether the node is transient or permanent). In addition, the storage proxy database 255 optionally provides information on the operating system employed by the node and the current IP address of the node. The storage proxy database 255 is optionally indexed by a global unique identifier (GUID), in a known manner.

The exemplary profile information maintained in the storage proxy database 255 may be obtained, for example, by a profile service that can be integrated with, or independent of, the proxy service 250. For example, the profile service may obtain information directly from each potential storage proxy 260 regarding the state of the node (e.g., whether the node is behind a firewall) and its resources. In addition, in a further variation, after a given receiver 220 has received a file or a portion thereof from a given storage proxy 260, the receiver 220 can provide a confirmation report to the profile service. In this manner, the validating information from the receivers 220 reduces the likelihood of abuse by the storage proxy 260.

Encryption in a Cooperative File Distribution System

According to one aspect of the invention files 205 that are transmitted in the cooperative file distribution system are encrypted in transit. In this manner, the files 205 are not compromised by eavesdropping. In one exemplary implementation, an Advanced Encryption Standard (AES) 256 in Counter (CTR) mode is employed.

Figure 3:
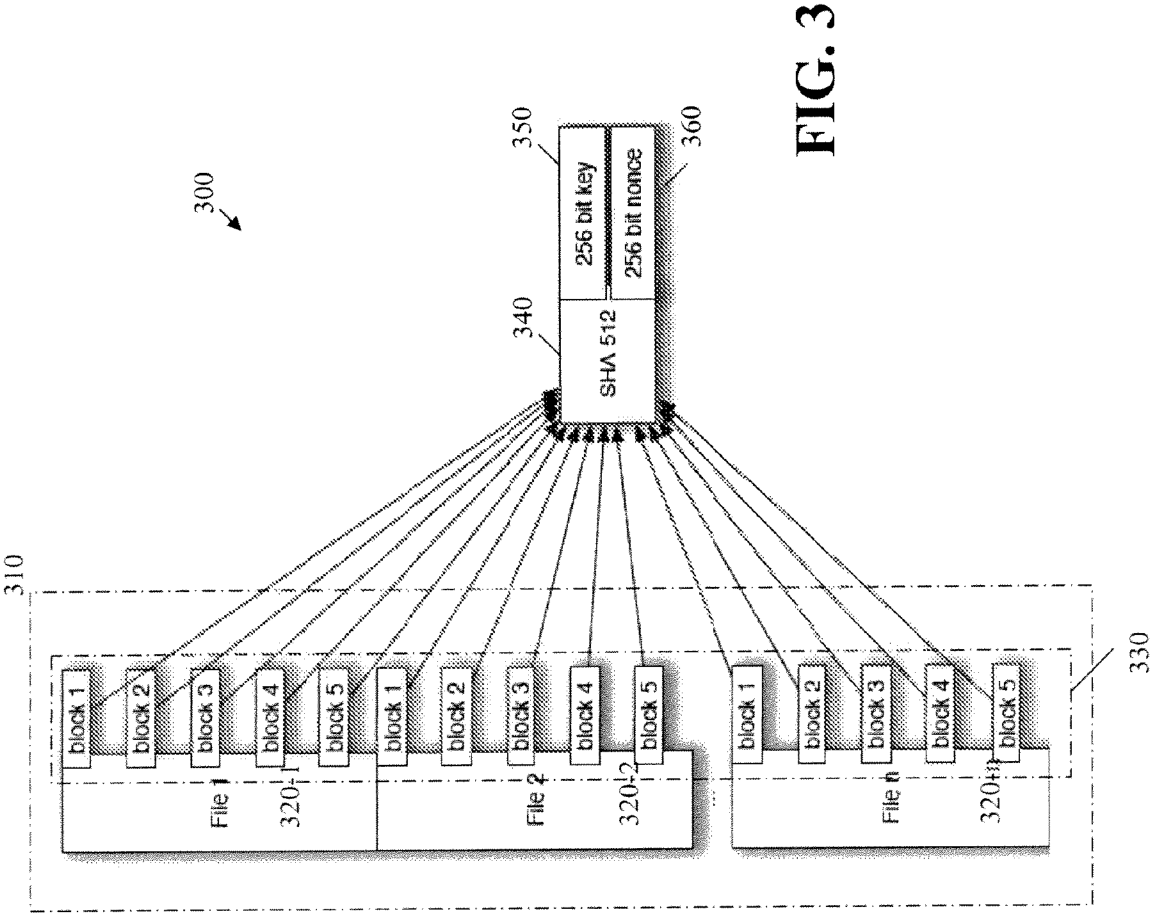
FIG. 3 illustrates an exemplary key generation process for generating an encryption key and nonce in accordance with an exemplary embodiment of the present invention.

FIG. 3 illustrates an exemplary key generation process 300 for generating an encryption key 350 and nonce 360 in accordance with an exemplary embodiment of the present invention. The technique shown in FIG. 3 can be employed for potentially very large files. As shown in FIG. 3, the encryption key 350 and nonce 360 for a package 310 comprised of one or more files 320-1 through **320-*n* are generated in an exemplary embodiment by applying a Secure Hash Algorithm (SHA-512) hash to blocks (i.e., samples) 340 from the package. The first 256 bits of the hash are used as the key 350, and the next 128 bits of the hash are used as the initial nonce 360**.

In this manner, the encryption key 350 depends on the content of the file(s) 320. In the exemplary implementation shown in FIG. 3, the blocks 340 are five evenly-spaced 4K sampled blocks from each file 320.

The process 300 produces the same key 350 and nonce 360 for the same package 310 of ordered files 320. In this manner, two users can package the same content (e.g., the same video) and share a torrent. The duplicate content only needs to be stored once. In addition, users who independently publish the same data can take advantage of sharing a P2P torrent without being aware of each other.

If a given file 320 is less than 20K, the whole file is used. The use of the blocks 330 allows the key 350 and nonce 360 to be generated without reading the entire file(s), which can be long, in a similar manner to a thumbprint. Otherwise, each file would have to be scanned twice, once to generate the key and nonce, and once to hash it for torrent packaging, which would take too long.

Figure 4:
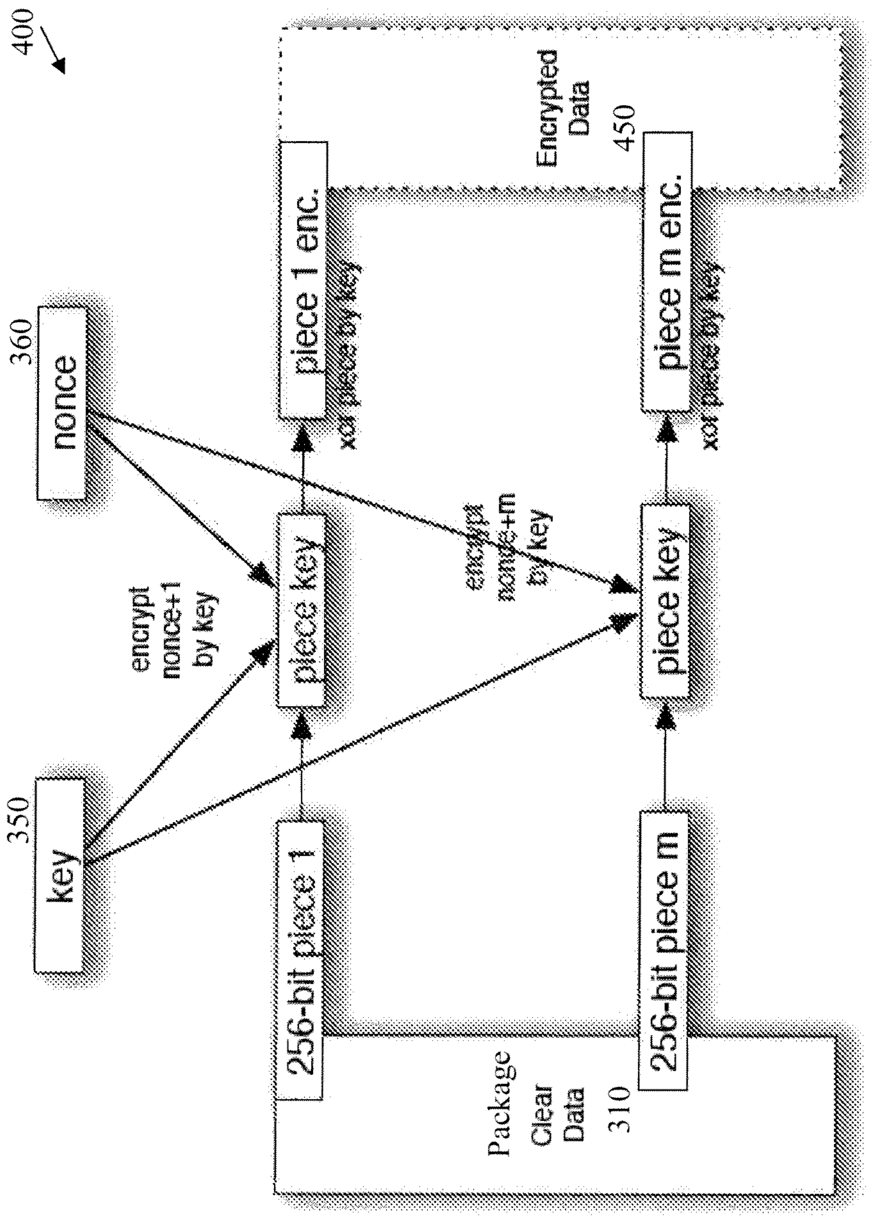
FIG. 4 illustrates an exemplary encryption process for encrypting a package of files using the encryption key and nonce generated by the process of FIG. 3.

FIG. 4 illustrates an exemplary encryption process 400 for encrypting the package 310 using the encryption key 350 and nonce 360 generated by the process 300 of FIG. 3. According to one aspect of the invention, the encryption process 400 employs a random access encryption technique that allows any individual encrypted pieces that are received by a receiver 220 to be decrypted.

In one exemplary embodiment, the encryption process 400 uses an AES 256/CTR technique based on the AES encryption scheme using 256-bit keys 350, 128-bit blocks, and a 128-bit nonce 360. As shown in FIG. 4, for block N in the stream, (nonce+N) is encrypted using the key 350 and the result is applied to an exclusive or (XOR) gate (not shown) with the block to be encrypted to generate the encrypted data 450. As indicated above, this encryption technique allows the stream to be decrypted in random order. For a detailed description of CTR, see, for example, Wikipedia, "Block Cipher Modes of Operation," (http://en.wikipedia.org/wiki/Block_cipher_modes_of_operation).

Figure 5:
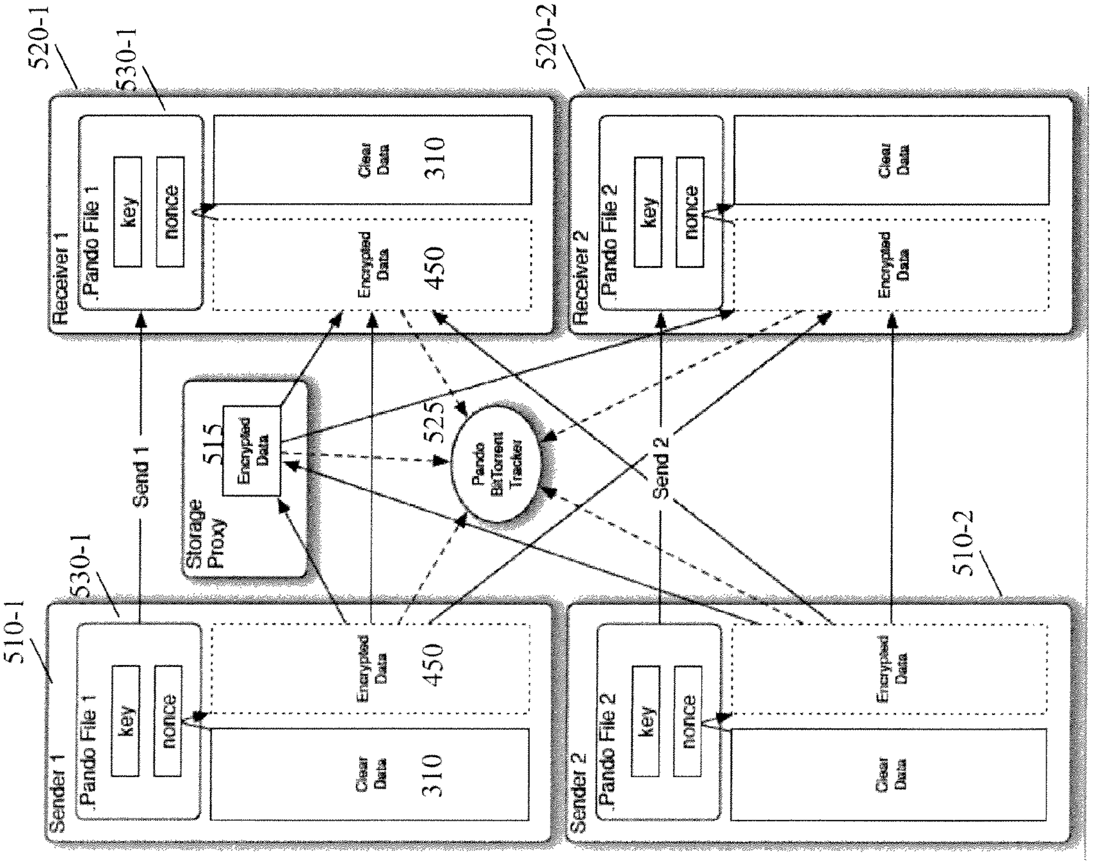
FIG. 5 illustrates the transmission of encrypted data in accordance with the present invention between one or more senders and one or more recipients.

FIG. 5 illustrates the transmission of encrypted data in accordance with the present invention between one or more senders 510-1 and 520-2 and one or more recipients 520-1 and 520-2. As shown in FIG. 5, data is transmitted in the exemplary cooperative file distribution system using a storage proxy 515 and a tracker 525, as discussed above in conjunction with FIGS. 1 and 2.

According to one aspect of the invention, the data is delivered through the cooperative file distribution system as encrypted data. In other words, the clear data is handed off to the Bit Torrent system as encrypted data. The clear data 310 is encrypted into encrypted data 450 using the exemplary encryption process 400 shown in FIG. 4. The storage proxy 515 does not have the key 350 or nonce 360. As shown in FIG. 5, the senders 510 and receivers 520 have the pando files appropriate for the transmitted information, such as the pando files 530-1 for the sender 510-1 and receiver 520-1. The pando file 530 includes the key 350 and nonce 360 for the encrypted data 450, which allows the recipient 520-1 to decrypt the encrypted data 450 and access the original clear data 310.

In this manner, the encrypted data 450 is delivered without the ability to decrypt the data midstream. The encrypted data 450 is thus delivered with the benefits of Bit Torrent (including piece by piece integrity checks) without being able to access the original data. The data is stored by the storage proxy 515 but the storage proxy 515 has no ability to access the underlying clear data 310.

Uploading Content

Figure 6:
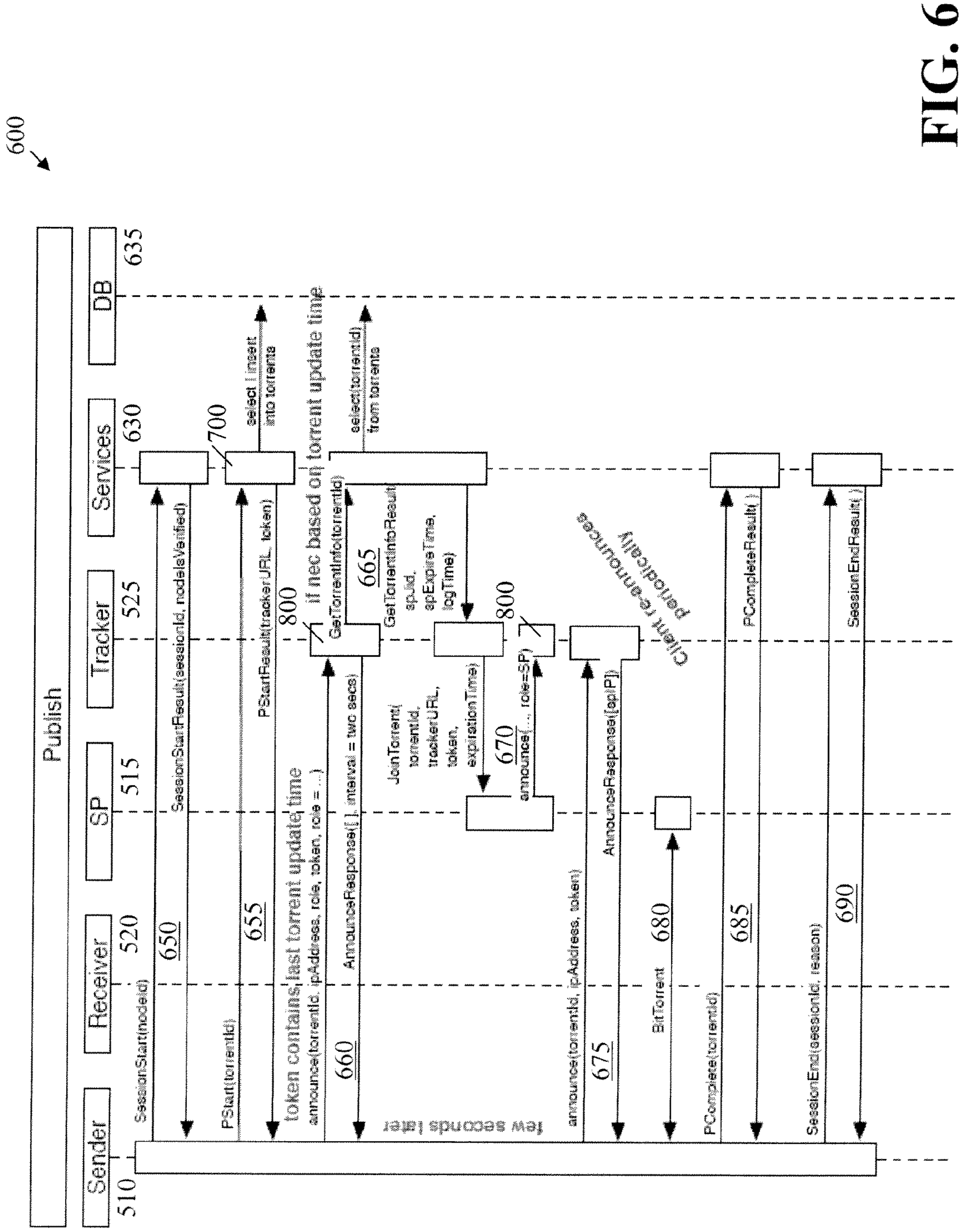
FIG. 6 is a communication sequence diagram in accordance with a Unified Modeling Language (UML) notation, illustrating exemplary communications and other processing performed by the various entities of FIG. 2 for uploading (publishing) content into the cooperative file sharing system.

FIG. 6 is a communication sequence diagram 600 in accordance with a Unified Modeling Language (UML) notation, illustrating exemplary communications and other processing performed by the various entities of FIG. 2 for uploading (publishing) content into the cooperative file sharing system. As shown in FIG. 6, the communication sequence 600 is initiated during step 650 by the sender 510 attempting to login to obtain permission to send one or more files. The sender 510 and services processor 630 have a "session start" message exchange, whereby the sender 510 provides a node identifier, and the services processor 630 determines if the sender 510 has the appropriate permissions to send the desired file(s). If the sender 510 is approved, the sender 510 receives a "session start result" message containing, for example, a session identifier, and indication that the sender node was verified. Generally, the services processor 630 controls authentication and database access.

After the sender 510 is validated by the message exchange 650, the sender 510 attempts to start a session using message exchange 655. Generally, the sender 510 sends a "start" message to the services processor 630, which executes a storage proxy allocation process 700, discussed further below in conjunction with FIGS. 7A through 7C. Upon selecting a storage proxy 515 and tracker 525, the services processor 630 will store the information in the database 635 and provide the result to the sender 510, with an identification of the assigned tracker 525 and a token, discussed further below in a section entitled "Tracker Tokens." Generally, tracker tokens are used to control access and use of the tracker 525, without requiring further database access.

The token is a key that can be decrypted by the tracker 525. Among other information, the token contains the last torrent update time.

After the sender 610 is notified of the tracker 525 assigned to the bit torrent, the sender 610 announces his or herself to the tracker 525, during a message exchange 660. As shown in FIG. 6, the sender 610 sends an announce message to the tracker 525. The announce message includes the assigned token, which allows the tracker 525 to validate the sender 610. The announce message will trigger the tracker 525 to execute an announce interval computation process 800, discussed further below in conjunction with FIG. 8. In addition, based on the torrent update time included in the token, the tracker 525 may be required to communicate with the services processor 630 to obtain (update) the torrent information, using the torrent identifier, during a message exchange 665.

After implementing the announce interval computation process 800, the tracker 525 will send an announce response to the sender 510. The announce response includes a listing of the peers associated with the bit torrent, discussed further below in a section entitled "Tracker Peer Listing," as well as the assigned announce interval (two seconds in this example). If a storage proxy is required for the communication, message exchange 670 occurs between the tracker 525 and the assigned storage proxy 515. The message exchange 670 includes a request for the storage proxy 515 to join the bit torrent. The storage proxy 515 will respond to the tracker 525 with an announce message, which will trigger the tracker 525 to execute the announce interval computation process 800.

After the defined announce interval, the sender 510 will send another announce message during message exchange 675. During message exchange 680, the sender 510 publishes the file on the assigned storage proxy 515. The sender 510 will continue to announce periodically to the tracker 525 in accordance with the assigned announce interval. Thereafter, during message exchange 685, the sender 510 notifies the services processor 630 that the uploading is complete. Finally, the session is terminated during a message exchange 690 between the sender 510 and the 630.

Storage Proxy Allocation Process

FIGS. 7A through 7C, collectively, are a functional specification for a storage proxy allocation process 700 incorporating features of the present invention. As shown in FIG. 7A, the storage proxy allocation process 700 collects statistics 710 on each storage proxy to help determine the load experienced by each storage proxy. For example, in an exemplary embodiment, the collected statistics 710 include the total number of published torrents currently assigned to the storage proxy, the maximum number allowed and the amount of available disk space. The collected statistics 710 are stored in a storage proxies table 720, for example, along with an allocation factor, such as a user controlled number between 0 and 1.

The storage proxy allocation process 700 includes a section 730 for selecting a storage proxy. As shown in FIG. 7B, during section 730, the storage proxies table 720 is evaluated, and each storage proxy is assigned a weight based on the load values indicated in the table. Each storage proxy is selected with a frequency that matches its weight.

In one exemplary embodiment, shown in FIG. 7B, the storage proxy allocation process 700 allows storage proxies to be grouped in section 740, with weights calculated based on the assigned group. In this manner, different levels of services can be offered, such as higher quality services at a premium.

The weight function 750 of the storage proxy allocation process 700 is shown in FIGS. 7B and 7C. As shown in FIG. 7B, the available disk space is first computed in section 760. Thereafter, in the exemplary embodiment, four types of storage proxy resources are evaluated in section 770.

Finally, the weight is computed in statement 780. Since all of the factors are multiplied in the weight computation 780, any one factor being zero (e.g., available disk space) can prevent a storage proxy from being allocated any more torrents. Taking the weight to a fractional power (e.g., ^0.25), for example, smooths the distribution of weights, reducing the tendency of the equation to over-allocate for the most underutilized storage proxy. This factor can be manipulated to make the allocation scheme sufficiently responsive without being over-responsive.

Announce Interval Computation Process

FIGS. 8A and 8B, collectively, are pseudo code for an exemplary announce interval computation process 800 incorporating features of the present invention. The announce interval computation process 800 is initiated whenever the sender 510, receiver 520 or storage proxy 515 attempt to communicate with the tracker 525. The announce intervals are periodic heart beats. According to one aspect of the invention, the announce intervals are tuned to (i) reduce the load on the tracker 525; (ii) improve the efficiency of the swarmed transfer; and (iii) provide the appearance of responsiveness. For example, the announce interval can be proportional to the number of peers in a torrent. The announce interval computation process 800 allows the recency of the data to be balanced with the load. In general, the larger the number of peers in a swarm, the less time that is required to keep the information up to date (i.e., there is less impact if a peer logs off, so can be tracked in longer intervals).

As shown in FIG. 8A, the announce interval computation process 800 contains a number of conditional statements for establishing the announce interval for various situations. A first section 810 establishes a fixed announce interval for storage proxies. Being a critical contributor to the torrent transfer, storage proxies are tracked more closely than other peers. Section 820 establishes the announce interval for the situation where the storage proxy is being allocated. When a storage proxy 515 is being assigned to a torrent being uploaded (see storage proxy allocation process 700 discussed above), it is desired for the storage proxy and the sender 510 to connect quickly, so the announce interval is set to a lower value. Section 830 establishes the announce interval for the situation where a torrent has been inactive for a while. Generally, the announce interval can be increased for older torrents that have not been of significant interest for a period of time.

As shown in FIG. 8B, section 840 addresses the situation discussed above, where there is a large number of peers in a torrent. Section 850 establishes the announce interval for the situation where the senders are not behind firewalls. When the seeds are not behind firewalls, other peers can connect to them, therefore a longer announce interval is appropriate. Likewise, if a seed is behind a firewall, a shorter announce interval is appropriate, since other peers cannot connect directly to the seeds and the peers must be given addresses (for example, of storage proxies 515 containing the desired content) to connect to.

Tracker Peer Listing

As indicated above, the tracker announce response message 660 (FIG. 6) contains a list of the Internet Protocol (IP) addresses and listening ports of the peers in a torrent. According to one aspect of the invention, the listing is optimized to be as useful as possible for the peers. Therefore, not all possible addresses are listed.

In one exemplary embodiment, the listing of a peer in the tracker announce response message 660 is controlled by the following announce arguments:

NAT/external_ip—the IP address the announce message arrives from;

IP—the internal IP address reported in the announce URL;

port—the listening port reported in the announce URL;

show_seeds=1|0, 0 default (indicates who has the same content (whole file));

fw=0 not firewalled|1 firewalled|−1 don't know yet (default)

left=0 seed|# leech|−1 don't know yet type=sp|peer (default)

The response logic for the exemplary embodiment can be expressed as follows:

An SP peer (type=sp) always gets an empty list (storage proxies do not make outgoing connections).

A seed peer (left=0) only gets addresses of leeches, unless show_seeds=1 (seeds cannot communicate with other seeds).

FW=1 is not shown to other peers (peers with firewalls are not shown to other peers), unless both are behind the same NAT.

Peers behind different NATs don't see each other, unless peer is fw=0 (not firewalled)

An SP is not listed if a there is a certain count of seeds or a certain count non-firewalled seeds (offload delivery from storage proxies to peers to reduce costs).

In a further variation, if the list is longer than a specified length (such as 40-50 peers), the response can be randomized in the following manner:

The SP is always the first in the response.

X peers behind the same NAT as the requested peer are listed next.

The other peers are uniformly selected from the complete list.

Downloading Content

Figure 9:
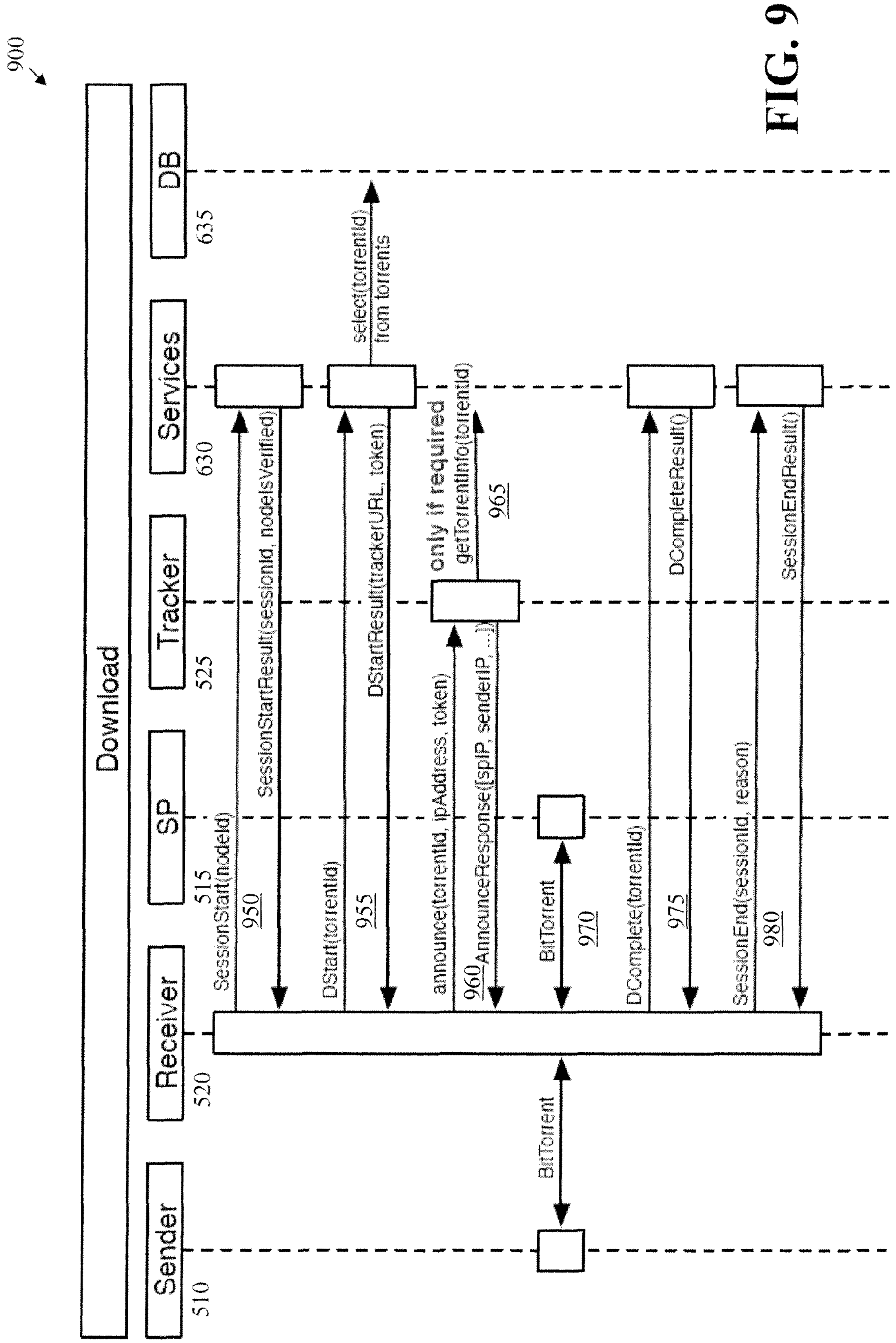
FIG. 9 is a communication sequence diagram in accordance with a UML notation, illustrating exemplary communications and other processing performed by the various entities of FIG. 2 for downloading content in the cooperative file sharing system.

FIG. 9 is a communication sequence diagram 900 in accordance with a UML notation, illustrating exemplary communications and other processing performed by the various entities of FIG. 2 for downloading content in the cooperative file sharing system.

As shown in FIG. 9, the downloading process 900 is initiated using a session start message exchange 950 between the receiver 520 and the services processor 630, in a similar manner to the message exchange 650 of FIG. 6, whereby the receiver 520 provides a node identifier, and the services processor 630 determines if the receiver 520 has the appropriate permissions to receive the desired file(s). If the receiver 520 is approved, the receiver 520 receives a "session start result" message containing, for example, a session identifier, and indication that the receiver node was verified. As indicated above, the services processor 630 controls authentication and database access.

After the receiver 520 is validated by the message exchange 950, the receiver 520 attempts to start a session using message exchange 955. Generally, the receiver 520 sends a "start" message to the services processor 630, which executes the storage proxy allocation process 700, discussed above in conjunction with FIGS. 7A through 7C. Upon selecting a storage proxy 515 and tracker 525, the services processor 630 will store the information in the database 635 and provide the result to the receiver 520, with an identification of the assigned tracker 525 and a token, discussed below in the section entitled "Tracker Tokens." As indicated above, tracker tokens are used to control access and use of the tracker 525, without requiring further database access. The token is a key that can be decrypted by the tracker 525. Among other information, the token contains the last torrent update time.

After the receiver 520 is notified of the tracker 525 assigned to the bit torrent, the receiver 520 announces his or herself to the tracker 525, during a message exchange 960. As shown in FIG. 9, the receiver 520 sends an announce message to the tracker 525. The announce message includes the assigned token, which allows the tracker 525 to validate the receiver 520. The announce message will trigger the tracker 525 to execute the announce interval computation process 800, discussed above in conjunction with FIG. 8. In addition, based on the torrent update time included in the token, the tracker 525 may be required to communicate with the services processor 630 to obtain (update) the torrent information, using the torrent identifier, during a message exchange 965.

After implementing the announce interval computation process 800, the tracker 525 will send an announce response to the receiver 520. The announce response includes a listing of the storage proxy 515 and sender 510 associated with the file(s), as well as the assigned announce interval.

During message exchange 970, the receiver 520 downloads the file from the assigned storage proxy 515 or sender 510 (or both). Thereafter, during message exchange 975, the receiver 520 notifies the services processor 630 that the downloading is complete. Finally, the session is terminated during a message exchange 980 between the receiver 520 and the 630.

Maintenance Operations

Figure 10:
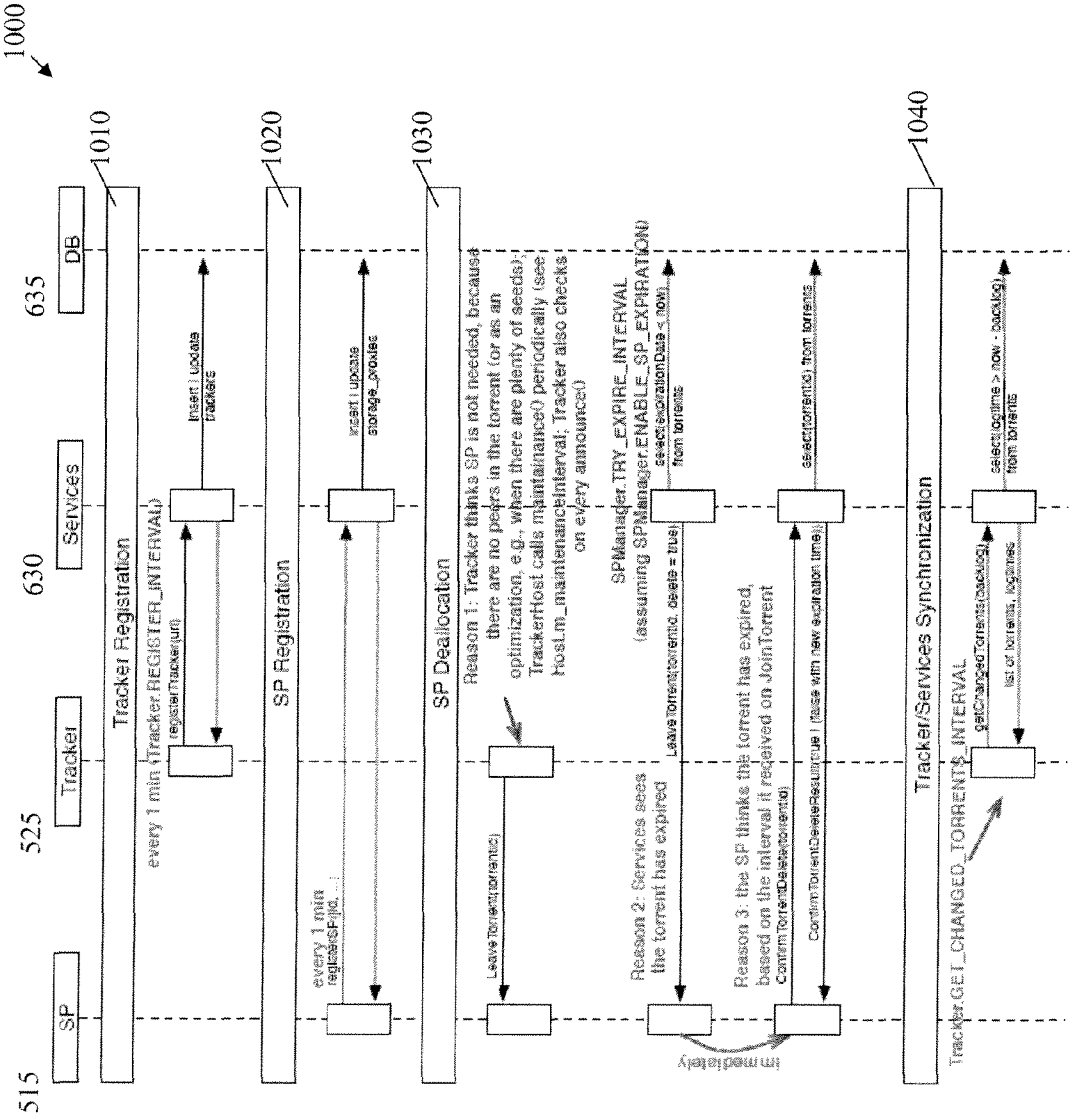
FIG. 10 is a communication sequence diagram in accordance with a UML notation, illustrating exemplary communications and other processing performed by the various entities of FIG. 2 for various operations in the cooperative file sharing system.

FIG. 10 is a communication sequence diagram 1000 in accordance with a UML notation, illustrating exemplary communications and other processing performed by the various entities of FIG. 2 for various operations in the cooperative file sharing system.

As shown in FIG. 10, during a tracker registration process 1010, the tracker 525 reports its state to the services processor 630, and the services processor 630 records the state information in the database 635.

During a storage proxy registration process 1020, each storage proxy 515 reports its state, such as its current load information, to the services processor 630, and the services processor 630 records the information in the database 635.

As shown in FIG. 10, for a storage proxy deallocation process 1030, there are three possible scenarios whereby a given storage proxy can be deallocated. In a first scenario, the tracker 525 recognizes that the storage proxy is not needed, for example, because there are no peers remaining in the torrent, or when there are a sufficient number of seeds and the storage proxy is no longer needed (to reduce costs).

In a second scenario, the services processor 630 recognizes that a given bit torrent has expired. In one exemplary implementation, bit torrents can be deleted after a defined expiration period. For example, each time a file is uploaded, the expiration period can be extended by two weeks. Therefore, a bit torrent available for two weeks from the last time the BT was published. (pstart received plus 14 days). The services processor 630 can expire the bit torrent and deallocate the associated storage proxy 515 after the bit torrent expires.

In a third scenario, the storage proxy 515 self terminates by notifying the services processor 630, if the storage proxy believes that the torrent has expired, based on the expiration interval that was indicated in the join torrent message 670 (FIG. 6).

As shown in FIG. 10, for a tracker/services synchronization process 1040, the tracker 525 and services processor 630 can synchronize the meta data associated with a bit torrent.

Tracker Tokens

As previously indicated, tracker tokens are used to control access to and use of the tracker 525 and reduce the number of accesses to the database(s) 635 for authentication purposes. The tracker tracks all peers who are participating in a torrent and help these peers to discover each other. Peers announce their presence to the tracker 525 on regular (announce) intervals, as discussed above, and are responded to with a listing of the addresses of other peers.

When peers upload or download content (package containing one or more files), as discussed above in conjunction with FIGS. 6 and 9, respectively, the package has an associated a tracker 525. When the sender 510 or receiver 520 send a start message 655 or 955, which includes the torrent identifier and peer identifier, they will receive a tracker URL and a tracker token string in the start result message, bound to the tracker, torrent identifier and peer identifier. The peer uses the tracker URL for tracker announcements, and includes the token string in the announcements.

In one exemplary implementation, the assigned tokens are valid for a limited time period. Thus, an announce response message may include a "token-expired" error. To obtain a new token, a peer may issue a request for a token from the tracker 525.

In one preferred embodiment, the token is an encrypted binary data structure. The tracker 525 and 630 can share a secret key. In one implementation, 128 bits AES encryption is used.

FIG. 11 is a sample table identifying an exemplary token format 1100.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:

receiving, from a sender, at a tracker computer that allows peers associated with related content to discover each other, a request to upload or download content;

determining, at the tracker computer, whether the sender of the request is authorized;

generating, at the tracker computer, a tracker token wherein the tracker token includes an identifier of the sender of the request to bind the tracker token to the sender of the request, and the tracker token is useable to establish an authorization between the sender of the request and the tracker computer;

sending the tracker token from the tracker computer to the sender of the request;

receiving the tracker token at the tracker computer in an announce message;

computing, at the tracker computer, an announce interval such that the announce interval is proportional to a number of peers in a torrent; and returning, from the tracker computer, the computed announce interval to the sender.

2. The method of claim 1, wherein the tracker can validate the sender of the request using the tracker token.

3. The method of claim 1, wherein the tracker provides a listing of one or more peers to the sender of the request in response to the announce message.

4. The method of claim 3, wherein the peers associated with related content are one or more senders and one or more recipients of the content.

5. The method of claim 1, wherein the tracker token has a defined expiration.

6. The method of claim 1, wherein the tracker token is an encrypted binary data string.

7. The method of claim 1, wherein the tracker token contains a last torrent update time and wherein the tracker obtains torrent information if a predefined torrent update time has been exceeded.

8. The method of claim 3, wherein the listing is empty if the sender of the request is a storage proxy.

9. The method of claim 3, wherein the listing comprises addresses of leeches if the sender of the request is a seed.

10. The method of claim 3, wherein the listing does not identify peers behind a firewall.

11. The method of claim 3, wherein the listing does not identify a peer behind a different network address translation (NAT) of the sender of the request unless the peer is not behind a firewall.

12. The method of claim 3, wherein the listing does not identify a storage proxy if a number of seeds satisfies a predefined criteria.

13. The method of claim 3, wherein the listing has a predefined maximum length, X, includes a storage proxy and a predefined number, Y, of peers behind the same network address translation of the sender of the request wherein Y plus 1 is not greater than X.

14. A method, comprising:

receiving, from a sender, at a tracker computer that allows peers associated with related content to discover each other, a request to upload or download content;

determining, at the tracker computer, whether the sender of the request is authorized;

generating, at the tracker computer, a tracker token wherein the tracker token includes an identifier of the sender of the request to bind the tracker token to the sender of the request, and the tracker token is useable to establish an authorization between the sender of the request and the tracker computer;

sending the tracker token from the tracker computer to the sender of the request;

receiving the tracker token at the tracker computer in an announce message;

computing, at the tracker computer, an announce interval such that the announce interval is set to a lower value when a storage proxy is being assigned to the torrent; and returning, from the tracker computer, the computed announce interval to the sender.

15. A method, comprising:

receiving, from a sender, at a tracker computer that allows peers associated with related content to discover each other, a request to upload or download content;

determining, at the tracker computer, whether the sender of the request is authorized;

generating, at the tracker computer, a tracker token wherein the tracker token includes an identifier of the sender of the request to bind the tracker token to the sender of the request, and the tracker token is useable to establish an authorization between the sender of the request and the tracker computer;

sending the tracker token from the tracker computer to the sender of the request;

receiving the tracker token at the tracker computer in an announce message;

computing, at the tracker computer, an announce interval such that the announce interval is increased for older torrents; and returning, from the tracker computer, the computed announce interval to the sender.

16. The method of claim 1, wherein computing an announce interval comprises generating a longer announce interval when a peer is not behind a firewall and generating a shorter announce interval when the peer is behind a firewall.

* * * * *